United States Patent [19]

McKechnie

[11] 4,366,424
[45] Dec. 28, 1982

[54] METHOD AND APPARATUS FOR PROGRAMMING AND OPERATING A MACHINE TOOL

[76] Inventor: Robert E. McKechnie, 2814 W. 38th Ave., Vancouver, B. C., Canada, V6N 2Y4

[21] Appl. No.: 41,634

[22] Filed: May 23, 1979

[51] Int. Cl.³ .............................................. G05B 19/10
[52] U.S. Cl. .................................... 318/568; 318/592
[58] Field of Search ............... 318/569, 568, 592, 594; 408/3, 13

[56] References Cited

U.S. PATENT DOCUMENTS

| | | | |
|---|---|---|---|
| 2,975,661 | 3/1961 | Coleman | 408/3 |
| 3,163,057 | 12/1964 | Drummond et al. | 29/704 |
| 3,648,143 | 3/1972 | Harper et al. | 318/568 |
| 3,689,892 | 9/1972 | Glenn et al. | 318/568 |
| 3,878,983 | 4/1975 | Hamill et al. | 318/569 |
| 3,890,552 | 6/1975 | Devol et al. | 318/568 |
| 3,939,566 | 2/1976 | Brekle et al. | 408/3 |
| 4,151,451 | 4/1979 | Maertins et al. | 318/568 |

FOREIGN PATENT DOCUMENTS

| | | | |
|---|---|---|---|
| 1287660 | 1/1969 | Fed. Rep. of Germany | 408/3 |
| 2043491 | 3/1972 | Fed. Rep. of Germany | 408/3 |
| 2151972 | 4/1973 | Fed. Rep. of Germany | 408/3 |

*Primary Examiner*—S. J. Witkowski
*Assistant Examiner*—Eugene S. Indyk
*Attorney, Agent, or Firm*—Carver and Company

[57] ABSTRACT

Method of programming an electronic processor to control an apparatus in which a tool performs a series of discrete operations on a work piece. Initially a pattern is traced manually by a tracer to reflect working of the tool on the work piece with the processor in "Record" mode and input position and location signals are simultaneously generated and recorded to reflect the relative positions of the tracer and pattern. When programmed, the processor is set in "Playback" mode and output position and location signals are fed to apparatus to position tool on work piece reflecting pattern and tracer positions. For accurate positioning of tool and work piece, pattern is a template with tooling indexes that could be made on template in "Record" mode, if desired. In the "Playback" mode, a stylus is positioned coarsely by the processor in such a manner as to engage the tooling indexes which then causes self-centering action to bring the tool and tooling indexes into alignment for accurate locations of the tool relative to the work piece. The apparatus has free moving positioning structure that permits direct manual relative movement between the pattern and tracer data to establish spatial relationships with respect to Cartesian or polar coordinates system. Position signal generator used initially in the programming mode can be used as negative feedback system in the "Playback" mode to improve performance.

18 Claims, 5 Drawing Figures

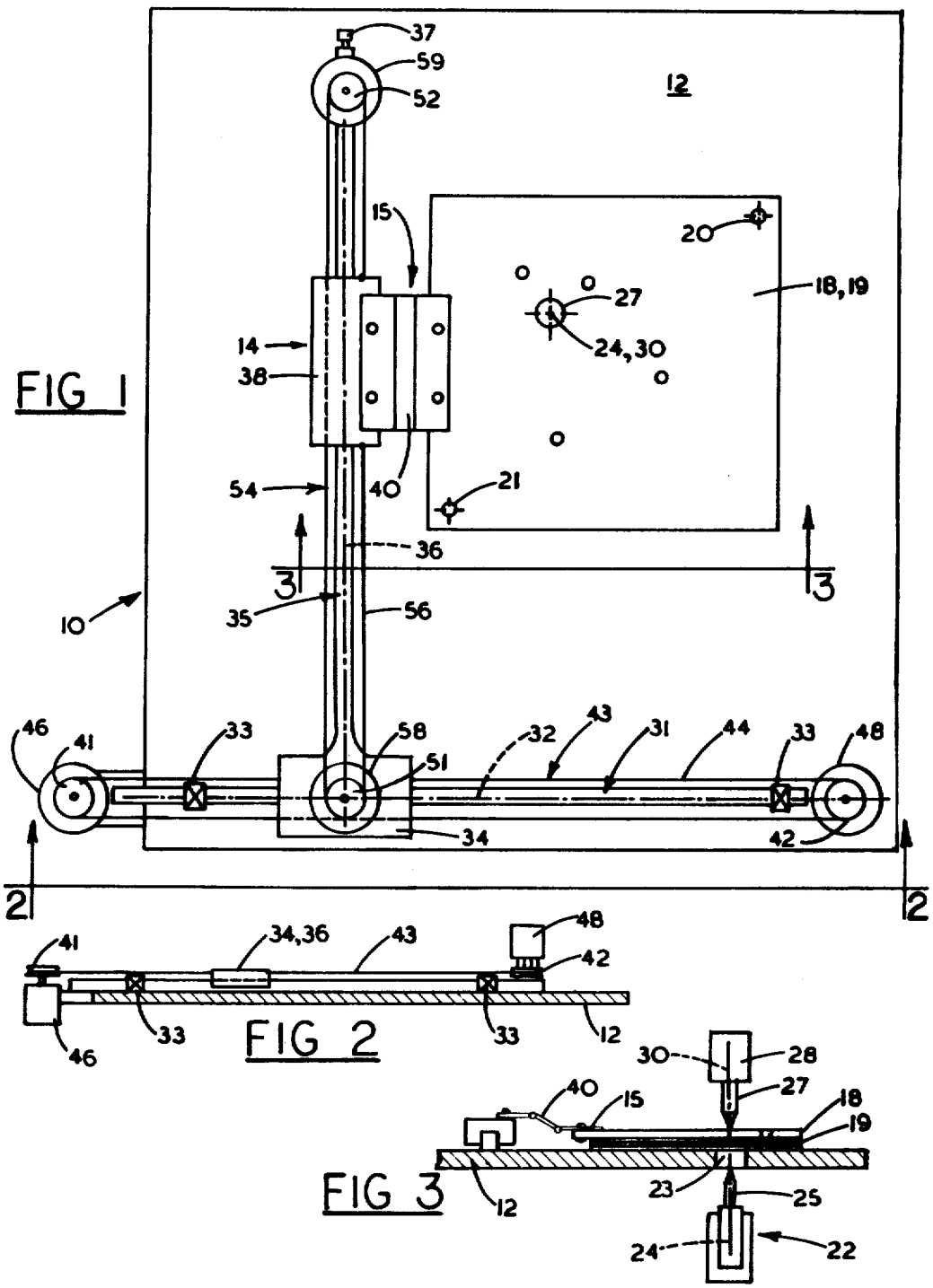

METHOD AND APPARATUS FOR PROGRAMMING AND OPERATING A MACHINE TOOL

BACKGROUND OF THE INVENTION

1. Field of the Invention

The invention relates to an apparatus and method for programming and operating a machine tool, particularly relating to, but not limited to, drilling printed circuit boards for electronic components.

2. Prior Art

Several approaches are used to drill holes in work pieces, such as printed circuit boards. For large quantities, fully automatic drilling equipment with precise mechanical components and numerical control techniques are used. To obtain the desired accuracy, high precision bearings, lead screws, etc. are used in a rigid and costly structure. This equipment uses a sophisticated control system and considerable time and skill are required to programme and maintain such devices.

For smaller quantities a single manual drill is commonly used in which an operator moves the work piece by hand, visually aligns the work piece with respect to a drill bit, and causes the drill bit to penetrate the work piece. Accurate work piece/drill bit alignment is assisted by an optical device which magnifies the hole position pattern imprinted on the work piece, or by a stylus that senses a hole in a template attached to the work piece. For use with the stylus, normally the operator first makes a template of the holes to be drilled in the work piece by using an optical magnifier for greater accuracy. The template is attached to the work piece and positioned under the stylus so that the stylus rests lightly on the template surface. As the template is moved relative to the stylus, when the stylus comes sufficiently close to a hole, it drops into it and a solenoid, air cylinder or other means forces the stylus down into the hole. The downward force moves the loosely held work piece and template into accurate alignment with the drill bit and simultaneously clamps the work piece flat to the drill table so that clean, accurate holes can be drilled. When the stylus has accurately positioned and clamped the work piece, a switch is actuated to commence drilling. For somewhat higher production rates, a quad drill can be used in which a drilled template is clamped to a work table and a self-centering stylus is aligned with the holes. Four drill bits are mechanically linked to the stylus to follow movement thereof and to drill simultaneously four stacks of boards clamped on the table. Some problems associated with these two manual methods relate to relatively low production rates, operator fatigue and operator error.

SUMMARY OF THE INVENTION

The present invention reduces some of the difficulties and disadvantages of the prior art by providing a relatively low cost, electro-mechanical apparatus which can use many existing components and simple manual operations of the prior art manual and quad drilling machine. The invention is susceptible of several embodiments, one of which is an apparatus and method for programming the processor in which a relatively unskilled operator programmes the processor by performing operations that closely resemble common drilling of a template on a manual drill as described. Another apparatus and method of the invention relates to automatic operation of a machine from a programmed processor in which the machine closely resembles that used in the previously described programming embodiment. A further aspect of the invention relates to use of the same machine for both programming of the processor and for subsequent automatic operation of the machine. When the machine is operating in an automatic mode, to improve the accuracy, a coarse positioning means can be used initially for locating each hole to be drilled, after which a fine positioning, hole sensing alignment means such as a prior art stylus, is used to effect accurate hole location. Thus, the electromechanical system need not position with great accuracy which reduces initial cost and maintenance requirements. Furthermore, use of unskilled operators for programming reduces set up costs and also eliminates the need for dimensioning or digitizing the holes usually associated with numerical control (N.C.) Machines.

A method according to the invention utilizes an apparatus to perform automatically a series of discreet operations utilizing a template which is provided with a pattern of indications of locations at which a tool is to work on the template or on a work piece. The method comprises the steps of manually recording relative movement between successive indications on the template and a tracer to generate positional data relating to said indications, and recording said positional data. The method further includes subsequently utilizing said recordings of positional data to generate relative movement between the template and an alignment means to attain approximate locations by coarse positioning. The method is further characterized by positioning the alignment means and template coarsely relative to each other so that the alignment means can respond to said indications, and utilizing directly the response of the alignment means to produce further relative movement by fine positioning to bring the alignment means axially into alignment with each of the indications in turn prior to operating on the work piece at the particular location. In one expression of the method the movement of the alignment means is utilized to bring successively into mutual alignment the indications on the template and the tool. Furthermore, after mutually aligning the indication on the template and the tool, the response of the alignment means is utilized to actuate the tool to perform successive operations on the work piece. Whilst manually causing relative movement between the indications and the tracer, an operator can visually align successively and accurately the tracer and pattern of indications, which indications are in the form of marks on the template. A working means is utilized to modify said indications to produce a tooling index which is in a form capable of being sensed by the alignment means. The method can also be characterized by, whilst utilizing said recordings, disabling the alignment means when passing between the indications to prevent essentially accidental engagement of the alignment means with non-target indications on the template.

An apparatus according to the invention is for use with an electronic processor for performing automatically a series of discreet operations on a work piece using a template which is provided with indications at locations where work is to be done. The apparatus has holding means, positioning means, signal generating means, drive means and alignment means. The holding means locates accurately relatively to each other either a template and tracer or a template and tool means. The positioning means cooperates with the holding means to permit direct manual movement between the template and tracer or driven movement between the template and tool means. The signal generating means cooperates with the positioning means to generate a location signal to reflect accurately relative positions between the tracer and template for recording in the processor when in the recording mode. The drive means cooperate with the processor and positioning means so that when the processor is in the play back mode the work piece and tool can be located approximately relative to each other by coarse positioning in response to output position signal from the processor. The alignment means is responsive to the indications on the template when sufficiently close thereto as a result of coarse positioning to produce directly relative movement between the template and the alignment means to position finely the template and alignment means in accurate alignment prior to working on the template. The apparatus can be further characterized by the working means being adapted to operate on the template at the indications to produce tooling indexes on the template which are of a form capable of being sensed by the alignment means. Furthermore, the apparatus can have disabling means cooperating with the alignment means to prevent essentially the alignment means accidentally engaging non-target indications during traverses of the alignment means relative to the template. The apparatus can also include feed back position signals generating means responsive to relative movement between the tool and the work piece to reflect relative positions thereof which, in the programming mode, can also serve as signal generating means.

A detailed disclosure following, related to the drawings, describes preferred embodiments of the invention which are capable of expression in method and apparatus other than those particularly described and illustrated.

DESCRIPTION OF THE DRAWINGS

FIG. 1 is a simplified diagramatic top plan of a portion of an apparatus according to the invention, a work piece being shown in position on a drill table, FIG. 2 is a simplified diagramatic side elevation, as seen from line 2—2 of FIG. 1, FIG. 3 is a simplified diagramatic side elevation, as seen from line 3—3 of FIG. 1 further including a representation of a stylus and drill generally similar to the prior art.

DETAILED DSCLOSURE

FIGS. 1 through 3

Figure 4:
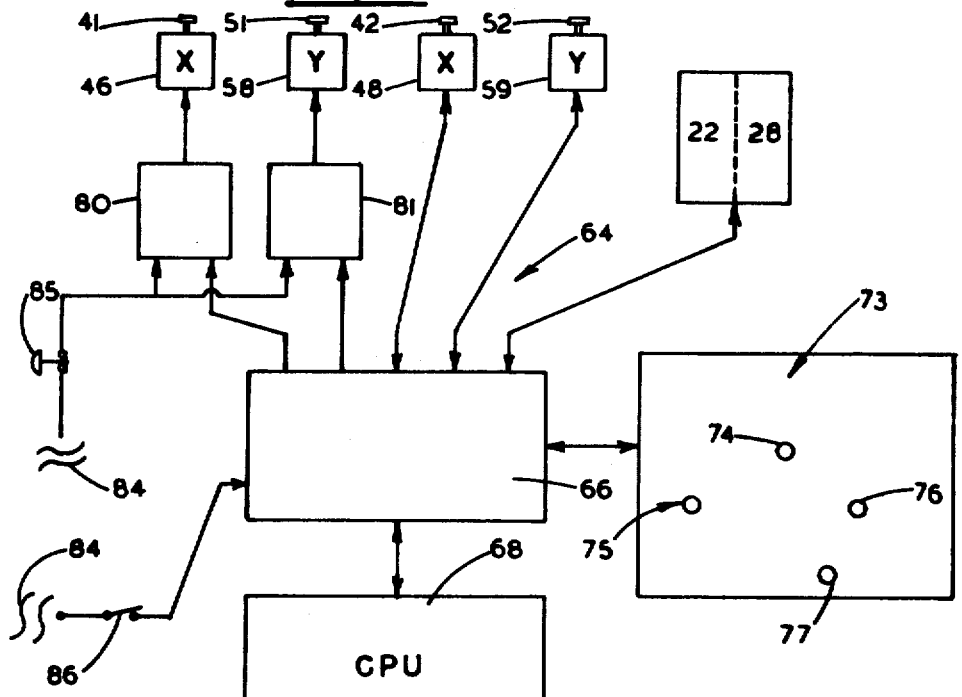
FIG. 4 is a simplified electronic schematic showing connections between electrical and electro-mechanical components and an electronic processor.

The apparatus will be described for use in drilling printed circuit boards using a manual drill, although equivalent work pieces and operations using other tools, such as a quad drill, can be substituted, as will be described. An apparatus 10 according to the invention is positioned on a conventional manual drill table 12 and includes a positioning means 14 and a holding means 15. A template 18 is located in the holding means 15, the means 15 being a releasable member that can hold a known template by itself, or one or more printed circuit boards 19, or a template attached to one or more printed circuit boards, to form a template/work piece combination. For use in the template/work piece combination, the template has a pair of widely spaced datum holes 20 and 21 which are aligned with similar holes in the work piece and located with pins to hold the template and work piece, ie. the respective data thereof, fixed relative to each other as is common practice when drilling boards.

As seen in FIG. 3, an upwardly facing drilling machine and drill control 22 is fitted below an opening 23 in the work table. The machine has a drill bit 25 having a drill axis 24 and being adapted to pass through the opening to drill the template and work pieces as required. An optical magnifier, not shown, with cross wires is commonly used for accurate centering of the template and the drill when drilling templates. The term "tracer" refers to the cross wires in the optical magnifier, or a fine pointer or equivalent that is effectively coupled to the drill to reflect accurate position of the drill axis to ensure the drill drills the template where required. Thus the tracer has a tracer datum that is fixed relative to a tool datum. For drilling circuit boards using a pre-drilled template to improve accuracy, a conical-pointed stylus 27, mounted in a stylus control 28, is accurately aligned with and positioned above the drill bit and thus the drill axis 24 and a stylus axis 30 serve as tool and stylus data respectively and are fixed relative to each other, and also to the tracer datum. The drill and control 22, the stylus 27 and the control 28 are prior art devices commonly used in manual drills used for drilling circuit boards and thus are not described structurally in detail, but the operation is summarized as follows. The stylus usually rests lightly on the drilled template and when the conical tip thereof enters a hole in a template, the stylus drops a little which initiates a self-centering effect as follows. Downwards force on the stylus is increased and side walls of the conical tip engage the opening in the template which causes the template to be shifted slightly to align the hole accurately with the stylus, and thus also with the drill. The downwards force on the stylus also clamps the template onto the work table to reduce undesirable movement during drilling. When resting lightly on the template, the stylus status is termed "enabled", and it can be raised clear of the template, which status is termed "disabled". The drill can be actuated and raised conventionally to penetrate the template and/or work piece by use of a foot switch (see FIG. 4) when drilling templates, or by a signal from the stylus control when using a template to align the drill for drilling boards. Thus, when used with drilled templates, the conical tip of the stylus provides an automatic self-centering effect so as to finely position the hole in the template accurately relative to the drill axis and also to initiate a clamping and drilling sequence. Thus the drill, stylus and work table and related accessories such as the optical magnifier for improved accuracy for drilling the template, resemble closely those used in conventional machines, such as a "Uni-Drill" as manufactured by Excellon International of the United Kingdom.

The invention relates to the method and means of positioning the template and the work pieces relative to the stylus and drill bit to enable programming of the processor when the processor is in a recording mode, and to enable automatic control of the apparatus and drill when the processor is in a playback mode operating under the programme. The positioning means 14 includes a fixed X—X ordinate arm 31 having an X—X axis 32 and being secured by releasable securing means 33 to the table 12 which permits the apparatus to be removed for servicing or replacing. The arm 31 is a rail and carries a slider 34 thereon, which can slide along the arm 31. A Y—Y ordinate arm 35 having a Y—Y axis 36 extends from the slider 34 in a direction at right angles to the direction of the X—X ordinate arm. Thus the Y—Y ordinate arm 35 extends from and is movable laterally along the X—X ordinate arm. A support roller 37 is carried at an outer end of the Y—Y arm 35 and runs along the upper surface of the table 12 to support the arm 35 on the table to be clear of the table. Thus the axes 32 and 36 correspond to respective Cartesian axes of a Cartesian coordinate system and the arms 31 and 35 resemble to some extent common drafting machines used in drawing offices. A carriage means 38 is mounted on the Y—Y ordinate arm for movement along the axis 36 and the holding means 15 is connected by a double hinge means 40 to the carriage means. The hinge means 40 permits swinging of the holding means 15 relative to the carriage means 38 to maintain the template and work pieces parallel to the table to accommodate different thicknesses of template/work piece combination. Thus the holding means 15 is mounted on the carriage for simultaneous movement along the arm 36 and is adapted to provide accurate relative location between the pattern and tracer datum in the second mode, and between the work piece and tool datum in the playback mode so that the data are located accurately relative to each other as desired.

The X—X ordinate arm has a pair of spaced apart, rotatable first loop rotor means 41 and 42, and a first loop of flexible tension link means 43 passing around the loop rotor means to ensure essentially slip free engagement with the loop rotor means. The loop rotors and link means are compatible, for example, tensioned flat steel bands running on a steel or rubber roller having a complementary cylindrical periphery, braided steel cables running on grooved pulleys, or moulded, toothed plastic bands running on toothed wheels. Any equivalent flexible tension link capable of transferring power from or to the loop rotor with negligible slippage can be used. An inner run 44 of the loop is connected to the slider 34 and thus is effectively connected to the Y—Y ordinate arm 35 to move the Y—Y ordinate arm laterally with the loop parallel to the direction of the X—X axis. A stepping motor 46 is connected to the loop rotor means 41 and a rotary pulse generator 48 is connected to the loop rotor means 42.

The Y—Y ordinate arm 35 has a pair of spaced apart, rotatable second loop rotor means 51 and 52 and a second loop of flexible tension link means 54 passes around the second loop rotor means to ensure essentially slip free engagement with the second loop rotor means. An inner run 56 of the loop is connected to the carriage means 38 to move the carriage means with the loop in the direction of the Y—Y axis. Similarly, to the X—X ordinate arm, the Y—Y ordinate arm has a stepping motor 58 connected to the rotor means 51 to drive the loop 54, and a rotary pulse generator 59 connected to the rotor means 52.

The stepping motors are connected to the processor and are adapted to rotate in accurate increments in a particular direction in response to electrical signals or pulses from the processor and equivalent motor means can be substituted. Thus, the arms 31 and 35 have first and second motor means connected to the processor and adapted to drive at least one loop rotor means of the respective arm. The pulse generators 48 and 59 are similarly connected to the processor and adapted to generate accurately signals or electrical pulses to represent rotation in a particular direction to indicate movement of the slider 34 or carriage 38 along the respective arms relative to a respective datum. Each axis has a respective datum and typically the intersection of the axes is chosen and programmed in the processor.

The positioning means 14 is adapted for relatively low friction movement to permit relatively easy manual positioning of the template and work piece where required on the table. The roller 37 supports the arm 35 clear of the table to reduce drag, and the tension in the loops 43 and 54 is sufficient to essentially prevent slippage between the loop rotor means and yet permit driving of the loops and arms when the operator directly shifts the holding means during programming. Thus the positioning means cooperates with the holding means and the tracer and thus the tool to permit direct manual movement between the pattern and tracer data to establish new relative relationships therebetween.

As will be described, in the programming mode, the pulse generators 48 and 59 are input position signal generating means cooperating with the positioning means and the processor so as to generate position signals to reflect relative positions of the tracer and template as the positioning means is moved manually, i.e. is directly held by the operator. Also, in the programming mode, location signals reflecting relative positions of the tracer and template are generated by the foot switch actuating the drill control to initiate the drilling operation, termed a drill signal, which signal is combined with the corresponding position signals from the pulse generators as will be described. Thus the pulse generators and drill control are input location signal generating means cooperating with the positioning means and the processor to generate and record location signals reflecting relative positions of the template and tracer when the tool is to be actuated at each operation location.

In a reverse mode, ie. in the playback mode, low friction movement is also desirable when the positioning means is driven by the stepping motors. As will be described, in the playback mode, the pulse generators may serve as feedback position signal generating means responsive to the movement of the first and second loops to reflect relative positions of the carriage from the respective data. Thus the pulse generators serve two different functions in the two different modes. It can be seen that relative motion and spatial relationships of the drill or stylus and template data are defined with respect to a Cartesian coordinate system.

FIG. 4

The apparatus 10 is for use with an electronic processor 64, which is shown schematically with some of its major components and the main electro-mechanical components of the apparatus 10. The processor 64 includes interface and logic devices 66, and a central processing unit 68 (CPU) which can be programmed as required. The CPU 68 is connected to a read and write memory 70 (RAM) and a read only memory 72 (ROM). A memory location pointer 71, maintained as part of the computer software, is used to address particular memory locations in the RAM 70. An operator's panel 73 is connected to the interface 66 and has a "Waiting" mode indicator light 74, a "Record" switch 75, a "Drill" or "Playback" switch 76, and a "Completed" switch 77. The interface 66 is also connected to motor drives 80 and 81 which are common components that process signals to the stepping motors 46 and 58, and to the drill and stylus controls 22 and 28 respectively, shown integrated because they are commonly sold and operated as an integrated unit. The controls 22 and 28 control and also indicate to the processor the status of the drill, and the status of the stylus. Power is supplied from a power source 84 through an emergency switch 85 to the motor drives 80 and 81, and through an operator's foot switch 86 and the interface 66 to the CPU 68.

OPERATION

Power is supplied to the processor which is normally in the "Waiting" mode, as indicated by the indicator light 74. In this mode, the processor is waiting for a signal to either assume a "Record" mode or a "Playback" or "Drilling" mode. In the "Waiting" mode the computer continuously reads the two switches 75 and 76, and assumes the appropriate mode when the relevant switch is pressed.

Initially it is assumed the operator has an undrilled template upon which a pattern of holes to be drilled is marked, typically by a photo-etching process. This is termed a blank template and this is accurately and securely attached to the holding means 15 so that the datum holes 20 and 21 are located accurately relative to the holding means 15. Thus the template is located accurately in the apparatus so that the drill datum is effectively located accurately relative to the template datum. As is well known in the trade, to avoid hole burr problems associated with the stylus, a template is normally drilled in reverse to produce a hole pattern which is a mirror image of the desired drilled circuit board. This should be understood when considering the relative locations of the template and drill data in the following description and in the claims. The "Record" switch 75 on the operator's panel is pressed to set the computer in the recording or programming mode. For greater accuracy in positioning the drill relative to the template, the operator preferably uses the optical magnifier as commonly supplied on conventional manual circuit board drilling machines. The operator moves the blank template to an origin hole and this position is located accurately relative to the drill datum using the optical magnifier. A hole is then drilled in this position by actuating the foot switch 86 following normal manual drilling practice and the drill control 22 initiates a drill signal to the processor, thus defining a first location. This sets the memory location pointer 71 to indicate the first location in the RAM 70 where the position data is to be stored, and simultaneously clears the contents of that location. This establishes the first location in the template as the origin.

The operator then takes hold of the work piece or holding means to manually move the work piece from the first location towards a different location, and this actuates the positioning means 14 causing it to follow the movements of the template. The loops 43 and 54 are shifted which in turn rotate the rotary pulse generators 48 and 59, assuming the template movement is represented as movement relative to both X—X and Y—Y axes. The pulse generators produce electrical pulses and direction bits representative of distances and direction travelled relative to the X—X and Y—Y axes. Thus the operator is manually and directly causing relative movement between the template and drill data to establish a different relative relationship between the template and drill data, which is defined as a second location. Thus, simultaneously with the template movement, a plurality of input position signals are generated by the pulse generators and recorded to reflect the relative movement between the template and drill data. Under the direction of its programme which is stored permanently in the ROM 72, the CPU 68 checks each pulse as it is generated and either increments or decrements contents of the pointed-at memory locations, the pulses being added or subtracted depending on the direction of travel along the respective axis.

Again, when the template is accurately located with respect to the drill at the second location, the operator steps on the foot switch 86 to generate a a drill signal and initiate the drilling cycle. Again the CPU 68 detects the drilling, increments the memory location pointer 71 by as many address spaces as are necessary to find unused memory space and clears the contents of the pointed-at memory location. Thus, a second input location signal is generated and recorded at the second location to reflect the relative positions of the template and drill data at the second location. It can be seen that, to set the memory location pointer 71 to indicate the location for drilling, a portion of the location signal is generated by the drill operating on the template in a manner similar to the drill drilling the work piece in the subsequent drilling operations. The remaining portion of the location signal is derived from the position signals already entered in the CPU 68. Thus this recording of drill hole location does not require any special operator skill or procedure. This process repeats itself until the last hole has been drilled in the template, at which time pushing the "Complete" switch 77 transfers programme control back to the "Waiting" mode confirmed by the waiting light 74. Before the transfer, provision is made to ensure that the last memory location point contains all zero data, because this is needed to indicate the end of a drilling cycle when the work piece is being drilled automatically, as will be described.

Thus all the hole position data is now stored in the RAM 70 and this can be used to control the apparatus 10, or similar pieces of equipment as will be described. When it is to be used in the apparatus 10, the drilled template 18 is now pinned to a blank board 19 or stack of boards using pins, not shown, passing through the two datum holes 20 and 21 which are aligned with holes in the boards to form the template/work piece combination. This combination is held by the holding means 15 in a manner similar to holding the template by itself in order that the combination is accurately located, with the understanding of the mirror image reversal of the template relative to the circuit boards. This ensures that the work piece combination datum is accurately positioned effectively where the template datum was positioned during the programming, so that the holding means provides accurate relative location between the work piece and tool datum. Clearly the work piece datum, in this arrangement, is effectively coincident with the pattern datum which contrasts with some other types of drills, eg. a quad drill, as will be described.

When the template/work piece combination has been loaded into the holding means, the "Drill" or "Playback" switch 76 is actuated and the drill routine of the CPU 68 sets the memory location pointer 71 to indicate the location in the RAM 70 where the position data of the second hole is stored. The contents of the pointed-at memory location are loaded into two seperate memory locations, labelled for convenience of description, "X Count" and "Y Count". The CPU 68 checks to see if the "X Count" and the "Y Count" both equal zero and if so, the cycle is complete and the control is transferred back to the "Waiting" mode. The most significant bits of the X and Y data in two Counts are checked to establish the directions of rotation of the stepping motors representing movement along X—X and Y—Y axes. Motor direction flags within the interface and logic devices 66 are set to 1 or zero accordingly.

The operator manually moves the template/work piece combination until the first or origin hole of the template is positioned closely to the stylus. Because this is the origin in the programme also, it has no location signals. When the stylus tip drops into the hole, the control 28 increases stylus force which accurately aligns the template hole with the drill and applies the clamping force necessary for accurate drilling. When the aligning and clamping are satisfactory, the drill and stylus control 22 and 28 cause the drill to move up, drill a hole and retract, followed by release of the clamping force. This follows conventional stylus and drill control. After drilling, when the processor receives a signal from the drill control 22 indicating that the drill bit is clear of the work piece, flags are set within the interface and logic devices 66 which "disable" the stylus from sensing a hole. The stylus is thus lifted clear of the template surface which prevents the stylus from accidentally engaging or entering a non-target hole during a traverse of the template. A non-target hole is a hole drilled in the template which is not to be drilled, at that time, in the work piece and this might be because the non-target hole requires a different drill diameter, or for other reasons.

When the stylus is disabled, signals for high speed motor actuation are sent to the stepping motors 46 and 58 so that the positioning means is actuated to shift the template/work piece combination to the second location. As the positioning means 14 starts to move, the pulse generators 48 and 59 generate pulses reflecting movement relative to the X—X and Y—Y axes, and these pulses are detected by the CPU 68 and the X and Y Count memory locations are decremented once for each pulse. The value of the X and Y Count is checked regularly and when each of the X and Y Counts become less than a pre-determined number, for example 10, the corresponding drive is switched to a lower speed. When the Counts become less than the same pre-determined number, the stylus is "enabled", that is the stylus is dropped under light pressure to engage the surface of the template. Under the action of the low speed drive, the stylus approaches the hole and it commences to descend into the hole. At this point the stylus and drill controls 28 and 22 force the stylus down and executes the drilling cycle as previously described. A drill signal from the drill control 22 transfers programme control to a sub-routine which stops both stepping motors, clears X and Y Counts and then increments the memory location pointer. When the signal from the drill control 22 indicating that the drill is clear of the hole in the work piece is received by the CPU 68, programme control is transferred back to the start of the "Drill" or "Playback" programme. Drilling continues automatically in this manner until a zero block of data is encountered, at which point control is transferred back to the "Waiting" mode.

It should be noted that the actual path taken by the template as it passes under the stylus is not of importance, but the final location of the one hole relative to the previous hole, or origin, is of importance. Thus the term "trace" or "tracing" referred to earlier does not refer to an exact path definition but merely a point-to-point relationship. Thus the term "tracer" refers to the means which permits alignment of the drill and template data for the original programming, and exact repeating of the path connecting the holes together during programming is not required during playback of the programme.

From the above it can be seen that the pulse generators 48 and 59 serve two purposes, as follows. In the programming mode, when the operator manually moves the template for drilling, the stepping motors generate a plurality of input position signals to indicate relative movement between the drill datum and the template datum to result in the desired final position. In the playback mode, when the stepping motors move the template and work piece combination, the pulse generators again generate a similar plurality of signals which are now used as a series of feedback position signals which are fed into the processor. The signals are now used in a closed loop negative feedback system to improve performance of the device by reducing inaccuracies in final positioning of the work piece prior to drilling, by assuring that the holder does in fact attain the desired location. Although optional, this additional accuracy using feedback is easily attained with negligible increase in costs.

The stylus and drill means have the respective axes 30 and 24 aligned with each other, ie. are fixed relative to each other, and function in a manner similar to the prior art manual machine, and thus are not described in detail. However, the relative high accuracy or fine positioning of the well known and low cost stylus and drill combination is used to advantage with a relatively low accuracy or coarse positioning of the relatively low cost positioning means 14 of the invention. The accuracy of the positioning means 14 is dependent on resolution of the pulse generators and stepping motors, and general mechanical errors in displacement of the holding means as it travels relative to the respective X—X and Y—Y axes. A good condition, high precision stylus can usually detect a hole for accurate alignment therewith when the stylus crosses an edge of the hole sufficiently to generate sideways forces, which is typically within about 1.0 mm of the hole center, depending on hole diameter. This discussion is simplified but this limiting factor can be called "hole detection ability" of the stylus. For the initial programming, the pulse generators and positioning means should be able to resolve template movement to a degree or within a tolerance considerably less than the hole detecting ability. Similarly, the stepping motors should have a resolution or positioning ability to cause movement of the slider 34 and carriage means 38 to within the hole detection ability of 1.0 mm. By selecting compatible components, the stepping motors and simple loop and rotor system can position the work piece coarsely and yet sufficiently closely to a target hole in the template to enable the stylus to take over and to fine position the template to the required high degree of accuracy. Thus, for compatibility between the coarse and fine positioning devices, the coarse positioning tolerance, which includes the programming tolerance, must be less than hole detecting ability of the fine positioning means, otherwise the coarse positioning means might stop the template before it has come under the influence of the stylus. This would result in a malfunction of the device preventing further operation until corrected.

In summary, when programming, the drilling operations produce in the template a plurality of holes at relatively accurate locations relative to the template and stylus data and simultaneously generate position data. In the playback mode, the template/work piece combination is positioned coarsely in response to the position data, but sufficiently closely to the desired location to be within range of the alignment means. The hole is then located finely with the alignment means which automatically positions the work piece combination and drill data accurately relative to each other. The template/work piece combination is automatically clamped accurately in the desired location prior to drilling, is then drilled and after drilling is repositioned by repeating the operation. Preferably the alignment means is disabled during traverses between locations to prevent essentially accidental engagement of the alignment means with non-target holes in the template.

Because drilling is initiated only by the stylus locating a template hole accurately and not directly by a signal from the position data in the processor, it follows that a hole can be drilled only in the correct location as determined by the stylus and template. Thus, if for some reason, the positioning means stops the template in the wrong location that is outside the hole detecting ability of the stylus, the stylus will not be permitted to drop and thus a hole drilling sequence cannot be initiated. Thus the processor cannot generate spurious hole drilling instructions without verification by the template/stylus alignment. Thus the positioning means is effectively fail-safe with regards to hole locations and, theoretically at least, holes cannot be drilled in the work piece except first by verification by the template.

Thus, the high precision attained with the conventional well proven stylus and drill combination can be attained with a relative low cost "add-on" template positioner and processor. The processor can be simply programmed by an unskilled operator, and the same combination machine and processor can be operated in a playback mode and maintain desired accuracy with a drilling operation initiating means that is effectively fail-safe. Alternative and equivalent structures can be derived from this basic apparatus, as will be described.

In summary, it can be seen that the present invention has many advantages over the conventional automatic positioning devices. For example, the positioning means 14 can be of relatively low cost construction and can include enough free play between components so that dust contamination is not a problem. This contracts with the particularly strict cleanliness requirements of high precision N.C. Machines. Also a massive, solid structure is not required to maintain accuracy, instead the relatively light positioning means can be simply attached to an existing drill table. Motor means for the positioning means, that is the stepping motors or equivalents, can be directly connected to the main moving parts of the positioning means, thus eliminating any need for gear reduction devices and precision lead screws. The elimination of gear reduction devices and/or lead screws is particularly important, because not only does this reduce costs, but it also permits the operator to manually move the work piece freely during programming. This free movement is essential for fine movements and accurate positioning, and results from the low mechanical resistance to movement of the direct drive when "reversed," ie. when "driven" manually by the operator.

Because the positioning means 14 can be easily attached to drilling equipment which is commonly available in many drilling shops used for printed circuit boards, a manufacturer need only purchase and fit the positioning means and electronic processor, thus eliminating duplication of table, drill, drill sequencing control, optical magnifier and stylus positioning heads. Whilst the device is relatively simple and easy to maintain, should it fail it can be quickly removed and the operator can revert to conventional manual methods of positioning and drilling.

ALTERNATIVES AND EQUIVALENTS

Endless loop and rotor means has been described for translating rotary motion of the stepping motors into linear motion and vice versa and together with the stepping motors thus function as drive means operatively connected to the electronic processor and cooperating with the positioning means, so that, in the playback mode, the work piece and tool data can be located relative to each other at the desired location in response to output position signals from the processor. This is a low friction, low cost drive means which is easily adaptable to different sizes, easy to service and is relatively tolerant to dust. Alternative drive means for linear motion along the Cartesian axes can be substituted, such as a rack and pinion arrangement, a friction roller on a straight track, or a direct-acting pneumatic or hydraulic cylinder. Such equivalent drive means would cooperate with the axes of the Cartesian coordinate system and can be adapted to generate electrical signals, or to accept electrical signals, as in the previously described embodiment. Also, electrical stepping motors have been shown to drive the loops, but clearly equivalent AC or DC servo motors, or pneumatic or hydraulic cylinders could also be substituted as alternative motor means. Also, other position signal generating means or feedback means can be substituted for the rotary pulse generators, for example synchros, resolvers, optical diffraction gratings, potentiometers and variable inductance devices.

Furthermore, in the operation of the processor, one particular programming strategy has been described to show how data from the various devices is processed and stored, and how the various control signals are generated and utilized. Clearly, a variety of programming strategies and/or any number of digital or analogue control devices can be substituted to obtain the desired recording and playback operations.

The processor has been described in a basic form which does not disclose other aspects which would normally be incorporated. It would be desirable to have provision for loading hole data out of the RAM 70 and onto other storage media, such as magnetic or paper tape for long term storage of hole position data. Similarly, hole position data could be programmed into a suitable memory or other data storage means from a digitizing machine or other programme source, which programme can then be applied to the present apparatus for positioning templates. Clearly, an auxiliary power supply to preserve contents of RAM 70 should be provided to protect the memory if the main power supply failed. Also, memory capacity can be expanded for storing and subsequently using hole position data for more than one template. It is helpful if there is a provision for cancelling data that has been entered in error and replacing it with correct data. The operator's panel will also likely have switches and read out devices for controlling and monitoring the main power supply, recording the number of holes and boards drilled, etc., as well as other conventional control source data.

The apparatus could be used for programming drilling of work pieces other than templates, although it is preferable that the pattern be planar because the positioning means disclosed cannot accommodate wide variations from a plane defined by the Cartesian axes. That is the positioning means only permits movement of the pattern datum with respect to the tracer datum generally within the plane of the pattern. If the apparatus were to be used purely for programming a processor which was not required to operate with a conical pointed stylus on a drilled template, it would not be necessary to produce a template with accurately drilled holes. Thus the optical magnifier or fine pointer could be used to trace a simple flat hole pattern of a circuit photo reduced onto film. Thus no drilling would be performed during programming and the drill signals for the programme could be initiated by a simple switch to indicate point of working of the tool on the work piece. This method can be summarized as follows. The pattern is located accurately in the apparatus so that tool and tracer data are located accurately relative to a pattern datum, which relative position is defined as a first location. With the processor operating in a record mode, generating and recording at the first location a first input location signal to reflect the relative positions of the tracer and pattern data at the first location to establish an origin at the first location. This is followed by manually and directly causing relative movement between the pattern and tracer data to establish a different relative relationship between the pattern and tracer data defined as a second location. Simultaneously a plurality of input position signals are generated and recorded to reflect the relative movement between the pattern and tracer data. At the second location, a second input location signal is generated and recorded to reflect the relative positions of the pattern and tracer data at the second location. If desired, the input location signal can be triggered by a manually operated switch because the tracer need not necessarily be simulating drilling or operating on the template similarly to subsequent operations on the work piece. In the playback mode, the alignment means and template are eliminated and the work piece and pattern data are fixed relative to each other. The first location is established as the origin for the tool by visual alignment and the remainder of the holes are drilled relying on accuracy of the positioning means with or without the negative feedback system.

In another alternative, the apparatus permits use of templates drilled previously on a manual machine, in which case the apparatus would not require use of the optical magnifier for programming. The processor could be programmed using the stylus to engage the holes in the template, because the hole location signals are generated when the stylus detects and enters the hole.

In another alternative, discrete machining operations on the work piece or template other than drilling could be effected, for example spot welding, punching, or other processes. These operations do not require duplication on the template in the programming mode as described below. In the programming mode there is no requirement for actual marking of the pattern because the operator merely establishes the input location signals by use of a manual switch when the pattern is accurately located, possibly using an optical magnifying device as the tracer. However, for use in the playback mode where highly accurate location of the tool is required, it is preferable that the template is operated upon in some manner to produce tooling indexes which can be detected by a fine positioning means. The tooling indexes could be merely an indentation on the pattern surface, ie. a center punch mark, a chemical or magnetic interaction with the template, or some other process which results in a tooling index on the template, which index is detectable and registrable by a suitable alignment means which can be mechanical, electronic, magnetic, etc., to enable fine positioning of the two data within the desired tolerance. The term "alignment means responsive to the tooling indexes on the template" refers to general structure capable of detecting and registering accurately with each tooling index, and thus is considered equivalent to the prior art conical stylus engaging and aligning with a suitably sized hole in the template. Thus, in the playback mode, the work piece and tool data are positioned coarsely in an approximate location by the output position signals controlling the positioning means in response to programme data only. This to be within range of the alignment means, which when "enabled," can detect and cooperate with a tooling index causing the template and work piece to be positioned accurately, ie. located finely, in an accurate position. Thus the alignment means has an axis and it can be seen to be responsive to the tooling indexes on the template by detecting and cooperating with the tooling indexes on the template when sufficiently close thereto to position finely the work piece and tool data to align the tool and template as required. Similarly to the stylus, disabling means are provided to cooperate with the alignment means to prevent esentially the alignment means accidentally engaging non-target holes during traverses of the alignment means relative to the template.

Yet a further alternative relates to use in existing machines where the template and work piece is fixed, and the stylus and the drill are shifted manually. This arrangement is sometimes used in multi-drill head machines, for example in a quad-drill manufactured by Excellon International of the United Kingdom. In this arrangement, a movable, self-centering stylus cooperates with a fixed drilled pattern or template, and movement of the stylus is transferred through mechanical linkages to four drill heads operating simultaneously and in parallel motion to drill four fixed stacks of templates. This machine, which is used for larger production runs than are normally performed on a manual drill could benefit from certain aspects of the present invention. In this structure, as in the previous embodiment, the stylus and tool have respective data fixed relative to each other. Clearly the mechanical linkages now serve as positioning means cooperating with the holding means and the tool to permit direct manual movement, as previously described. The holding means are clearly clamping devices which locate the pattern or template and work pieces to the machine bed. Position and location signal generators, and drive means would cooperate with the linkages to reflect, and produce, relative movement between the stylus/tool and pattern/work piece.

FIG. 5

The apparatus of FIGS. 1 through 3 disclosed movement of a pattern or work piece which is defined relative to two mutually perpendicular Cartesian axes. An alternative positioning means 90 uses a polar coordinate system which contrasts with, but is considered equivalent to, the Cartesian system. The relative movement between the tracer and pattern data, or the tool and work piece data, is defined with respect to a polar coordinate system having a central axis 92 generally normal to the plane of the pattern or work piece, and a radial axis 93 within the plane of the pattern or work piece and extending from the central axis. The radial axis 93 can be swung about the central axis and its position is measured as an angle 94 relative to a fixed angular datum 95. The positioning means has a swinging arm 96 corresponding to the radial axis 93, the arm being journalled for rotation about the central axis 92. A carriage means 97 is mounted on the swinging arm for movement therealong and a similar holding means 98 is mounted on the carriage for movement along the swinging arm. A template, work piece, or combination thereof designated 99 is held in the holding means and radial spacing 100 of the work piece relative to the central axis 92 is measured on the radial axis as shown to define one coordinate of the work piece location. Position of the work piece is further defined with reference to the angle 94 of the radial axis from the angular datum 95.

The swinging arm 96 has a pair of spaced apart, rotatable loop rotor means 104 and 105, and a loop of flexible tension link means 107 passes around the loop rotor means to ensure essentially slip free engagement of the loop rotor means. One run 109 of the loop is connected to the carriage means 97 to move the carriage means with the loop in the direction of the radial axis. A first stepping motor 111 drives the loop rotor 104 to move the loop and thus the carriage means 97. A second stepping motor 113, if necessary through a reduction gear which is not shown, is connected directly to a bearing shaft, not shown, carrying the arm 96 so as to swing the arm relative to the angular datum 95.

Figure 5:
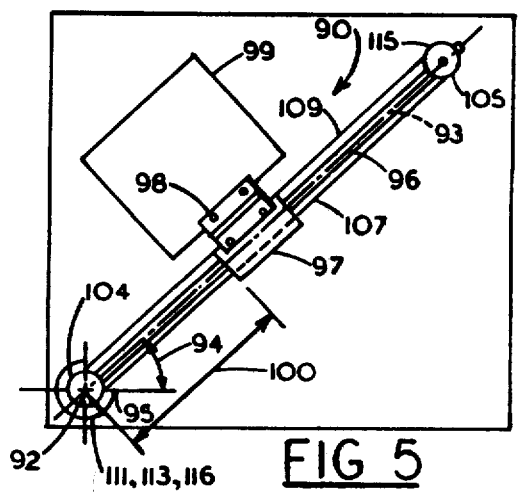
FIG. 5 is a simplified diagramatic plan of a first alternative using polar position coordinates.

Thus, the first and second motor means are connected to the processor and adapted to drive at least one loop rotor means and to swing the swinging arm respectively. Similarly to the first embodiment, first and second rotary pulse generators 115 and 116 cooperate with the loop rotor 105 and the arm 96 to serve as input position and location signal generators and also as feedback position signal generating means responsive to movement of the loop to reflect relative position of the carriage means and the central axis, and to be responsive to rotation of the swinging arm relative to the angular datum thereof. It can be seen that the polar coordinate system of FIG. 5 provides an equivalent positioning means to the Cartesian system of FIG. 1. In all embodiments, the positioning means cooperates with the holding means to permit direct manual movement between the pattern and tracer data to establish new relative relationships between the pattern and tracer data.

I claim:

1. A method of utilizing an apparatus to perform automatically a series of discrete operations utilizing a template which is provided with a pattern of indications of locations at which a tool is to work on the template or on a work piece, comprising the steps of:
   (a) manually causing relative movement between successive indications on the template and a tracer to generate positional data relating to said indications, and recording said positional data,
   (b) subsequently utilizing said recordings of positional data to generate relative movement between the template and an alignment means to attain approximate locations by coarse positioning, the method being characterized by:
   positioning the alignment means and template coarsely relative to each other so that the alignment means can respond to said indications, and utilizing directly the response of the alignment means to produce further relative movement by fine positioning to bring the alignment means accurately into alignment with each of the indications in turn prior to operating on the work piece at the particular location.

2. A method as claimed in claim 1 further characterized by: utilizing the movement of the alignment means to bring successively into accurate mutual alignment the indications on the template and the tool.

3. A method as claimed in claim 2, wherein, after mutually aligning the indication on the template and the tool, utilizing the response of the alignment means to actuate the tool to perform successive operations on the work piece.

4. A method as claimed in claim 1, wherein the step (a) relating to manually causing relative movement between the indications and the tracer includes:
   (a) visually aligning successively and accurately the tracer and pattern of indications, the indications being in the form of marks on the template, and
   (b) utilizing a working means to modify said indications to produce a tooling index which is in a form capable of being sensed by the alignment means.

5. A method as claimed in claims 1, 2, 3 or 4, wherein, prior to step (b) relating to utilizing said recordings, the work piece is clamped to said template so as to hold the work piece in accurate alignment with the template, and wherein, the alignment means is aligned accurately with the tool.

6. A method as claimed in claims 1, 2, 3 or 4, wherein, during step (b) relating to utilizing said recordings, the alignment means is disabled when passing between indications to prevent essentially accidental engagement of the alignment means with non-target indications on the template.

7. A method as claimed in claims 1, 2, 3 or 4, when used for drilling holes in a work piece in the form of a printed circuit board, wherein the tool is in the form of a drill.

8. A method as claimed in claim 7, wherein the alignment means is a stylus that can cooperate with the holes drilled in the template.

9. An apparatus for use with an electronic processor for performing automatically a series of discrete operations on a work piece using a template which is provided with indications at locations where work is to be done, the apparatus having: holding means to locate accurately relative to each other either a template and tracer, or a template and tool means; positioning means cooperating with the holding means to permit direct manual movement between the template and tracer, or driven movement between the template and tool means; signal generating means cooperating with the positioning means to generate location signals to reflect accurately relative positions between the tracer and template for recording in the processor when in the recording mode; drive means cooperating with the processor and positioning means so that, when the processor is in the playback mode, the work piece and tool can be located approximately relative to each other by coarse positioning in response to output position signals from the processor, the apparatus being further characterized by:
- (a) alignment means responsive to the indications on the template when sufficiently close thereto as a result of the coarse positioning to produce directly relative movement between the template and alignment means to position finely the template and alignment means in accurate alignment prior to working on the template.

10. An apparatus as claimed in claim 9 further characterized by:
- (a) working means adapted to operate on the template at the indications to produce tooling indexes on the template, which are of a form capable of being sensed by the alignment means.

11. An apparatus as claimed in claim 10 further characterized by:
- (a) the working means and tool means include a drill adapted to drill holes in the template, and also in the work piece,
- (b) the alignment means includes a stylus adapted to engage holes in the template and to cause relative movement between the tool and template to attain the desired accurate location.

12. An apparatus as claimed in claim 9, 10 or 11, further characterized by:
- (a) disabling means cooperating with the alignment means to prevent essentially the alignment means accidentally engaging nontarget indications during traverses of the alignment means relative to the template.

13. An apparatus as claimed in claims 9, 10 or 11 further characterized by:
- (a) feedback position signal generating means responsive to relative movement between the tool and the work piece to reflect relative positions thereof.

14. An apparatus as claimed in claim 13 in which the feedback position signal generating means serves as signal generating means in the programming mode.

15. An apparatus as claimed in claims 9, 10, 11 or 14 further characterized by
- (a) the template being essentially planar, and relative movement between the tracer and template, and between the work piece and tool means is defined with respect to a Cartesian coordinate system having two mutually perpendicular Cartesian axes within the plane of the pattern, and the positioning means is further characterized by:
- (b) a fixed X—X ordinate arm corresponding to one Cartesian axis and extending in one direction,
- (c) a movable Y—Y ordinate arm corresponding to the remaining Cartesian axis and extending in a direction at right angles to the direction of the X—X ordinate arm extending from, and being movable laterally along, the X—X ordinate arm,
- (d) carriage means mounted on the Y—Y ordinate arm for movement therealong,
- (e) the holding means being mounted on the carriage means for movement along the Y—Y ordinate arm, and the drive means is further characterized by:
- (f) the X—X ordinate arm having a pair of spaced apart, rotatable first loop rotor means, and a first loop of flexible tension link means passing around the loop rotor means to ensure essentially slip free engagement with the loop rotor means, one run of the loop being connected to the Y—Y ordinate arm to move the Y—Y ordinate arm laterally with the loop in the direction of the X—X axis, and a first motor means connected to the processor and adapted to drive at least one loop rotor means,
- (g) the Y—Y ordinate arm having a pair of spaced apart, rotatable second loop rotor means, a second loop of flexible tension link means passing around the second loop rotor means to ensure essentially slip free engagement with the second loop rotor means, one run of the loop being connected to the carriage means to move the carriage means with the loop in the direction of the Y—Y axis, second motor means connected to the processor and adapted to drive at least one loop rotor means, and the apparatus further includes:
- (h) feedback position signal generating means responsive to the movement of the second and first loops to reflect relative positions of the carriage from the respective data.

16. An apparatus as claimed in claims 9, 10, 11 or 14 further characterized by:
- (a) the template being essentially planar, and relative movement between the tracer and template, and between the work piece and tool means is defined with respect to a polar coordinate system having a central axis generally normal to the plane of the pattern and a radial axis within the plane of the pattern and extending from the central axis, in which the radial axis can be swung about the central axis,
- (b) a swinging arm corresponding to the radial axis and journalled for rotation about the central axis,
- (c) carriage means mounted on the swinging arm for movement therealong,
- (d) the holding means is mounted on the carriage means for movement along the swinging arm, and the drive means is further characterized by:
- (e) the swinging arm has an arm motor means to swing the arm about the central axis,
- (f) the swinging arm has a pair of spaced apart rotatable loop rotor means, and a loop of flexible tension link means passing around the loop rotor means to ensure essentially slip free engagement with the loop rotor means, one run of the loop being connected to the carriage means to move the carriage means with the loop in the direction of the radial axis, and a first and second motor means connected to the processor and adapted to drive at least one loop rotor means, and to swing the swinging arm respectively, and the apparatus further includes:
- (g) feedback position signal generating means responsive to movement of the loop to reflect relative positions of the carriage means and the central axis, and responsive to rotation of the swinging arm relative to a datum.

17. A method of automatically performing a series of discrete operations on a work piece with a tool, the method including use of an electronic processor programmed to cause relative movement between work piece and tool data, and to cause the tool to operate on the work piece, and use of an alignment means and a template, the template having a datum and tooling indexes thereon to designate accurately locations for operation of the tool, the alignment means being responsive to the tooling indexes, the method being characterized by:
- (a) locating the work piece and template accurately in the apparatus so that the work piece and the template data are fixed relative to each other in a manner similar to a fixed relationship between the tool datum and the alignment means,
(b) registering the alignment means with a tooling index at a first location to establish in the processor the first location as an origin for the tool and work piece data,
(c) with the processor operating in a play-back mode, outputting from the processor a plurality of output position signals to reflect relative positions of the work piece and tool data at a second location,
(d) automatically causing relative movement between the work piece and tool data in response to the output position signals outputted from the processor, to position the work piece and tool data coarsely in an approximate second location,
(e) permitting the alignment means to detect and register with a tooling index on the template corresponding to the second location thus causing relative movement between the tool and work piece data so as to position and locate the tool and work piece data finely and accurately at the second location,
(f) when the tool and work piece data attain the second location accurately, simultaneously triggering the processor with a second location signal and operating on the work piece at the second location which accurately reflects the second location on the pattern.

18. An apparatus for automatically performing a series of discrete operations on a work piece with a tool, the apparatus being adapted to cooperate with an electronic processor programmed to cause relative movement between work piece and tool data, and to cause the tool to operate on the work piece, the processor being programmed for use with an alignment means and a template, the template having a datum and tooling indexes thereon to designate accurately locations for operation of the tool, the alignment means being responsive to the tooling indexes and having a datum which is fixed relative to the tool datum, the template and work piece data being fixed relative to each other; the apparatus being further characterized by:
(a) holding means to provide accurate relative location between the template and alignment means, and between the work piece and tool data so that the data can be located accurately relative to each other,
(b) positioning means cooperating with the holding means, the alignment means and the tool to permit movement between the template and alignmet means data, and between the work piece and the tool data to establish new relative relationships therebetween,
(c) drive means operatively connected to the electronic processor and cooperating with the positioning means so that the work piece and tool data can be positioned coarsely relative to each other approximately adjacent a particular location in response to output position and location signals from the processor,
(d) the alignment means is adapted to cooperate with the tooling indexes on the template when sufficiently close thereto to position finely the work piece and tool data accurately at desired relative positions.

* * * * *